(12) United States Patent
Sullivan et al.

(10) Patent No.: US 10,210,351 B2
(45) Date of Patent: Feb. 19, 2019

(54) FINGERPRINT-BASED CONFIGURATION TYPING AND CLASSIFICATION

(71) Applicant: ServiceNow, Inc., Santa Clara, CA (US)

(72) Inventors: Josiah Sullivan, Sammamish, WA (US); Kelly Vincent, Renton, WA (US)

(73) Assignee: SERVICENOW, INC., Santa Clara, CA (US)

( * ) Notice: Subject to any disclaimer, the term of this patent is extended or adjusted under 35 U.S.C. 154(b) by 212 days.

(21) Appl. No.: 14/336,279

(22) Filed: Jul. 21, 2014

(65) Prior Publication Data

US 2016/0019296 A1  Jan. 21, 2016

(51) Int. Cl.
*G06F 17/30* (2006.01)
*G06F 21/73* (2013.01)
*G06F 21/44* (2013.01)
*G06Q 10/06* (2012.01)
*G06Q 10/08* (2012.01)

(52) U.S. Cl.
CPC .............. *G06F 21/73* (2013.01); *G06F 21/44* (2013.01); *G06Q 10/06* (2013.01); *G06Q 10/087* (2013.01)

(58) Field of Classification Search
CPC ...................... G06F 17/30864; G06F 17/30876
USPC .......................................................... 707/770
See application file for complete search history.

(56) References Cited

U.S. PATENT DOCUMENTS

| 5,619,724 A | 4/1997 | Moore |
| 6,005,942 A * | 12/1999 | Chan ...................... G06F 21/51 |
| | | 235/379 |
| 6,457,053 B1 | 9/2002 | Satagopan et al. |
| 7,310,629 B1 * | 12/2007 | Mendelson ......... G06F 17/3002 |
| 7,921,218 B2 * | 4/2011 | Cheng ................. H04L 12/2807 |
| | | 709/223 |
| 8,301,589 B2 | 10/2012 | Sen et al. |
| 8,365,201 B2 | 1/2013 | Holan et al. |
| 2006/0274753 A1 * | 12/2006 | Park .................... H04L 61/2038 |
| | | 370/392 |
| 2007/0192872 A1 * | 8/2007 | Rhoads ................... G06F 3/017 |
| | | 726/26 |

(Continued)

FOREIGN PATENT DOCUMENTS

EP    2 112 782 A1    10/2009

*Primary Examiner* — Rehana Perveen
*Assistant Examiner* — Hicham Skhoun
(74) *Attorney, Agent, or Firm* — Fletcher Yoder, P.C.

(57) ABSTRACT

Disclosed are techniques for automating records related to devices coupled to a network, such as servers, clients and memory banks. The fingerprint-based configuration typing and classification described herein may identify a fingerprint for a first device located on a network, the first device having a plurality of hardware components and the fingerprint generated based on a combination of at least two hardware components of the first device. The fingerprint is assigned to the first device. If the device does not have a first identifier assigned to it that identifies the plurality of hardware components, the fingerprint is compared to a plurality of stored fingerprints, with at least some of the stored fingerprints having a respective identifier. If the fingerprint matches one of the plurality of stored fingerprints and that stored fingerprint has an identifier associated therewith, the identifier associated with the stored fingerprint is assigned to the first device as the first identifier.

18 Claims, 4 Drawing Sheets

(56) References Cited

U.S. PATENT DOCUMENTS

| | | | |
|---|---|---|---|
| 2008/0043000 A1 | 2/2008 | Currid et al. | |
| 2011/0093703 A1* | 4/2011 | Etchegoyen | G06F 21/57 713/168 |
| 2012/0011704 A1* | 1/2012 | Hammouri | G06F 21/73 29/592.1 |
| 2012/0117419 A1* | 5/2012 | Hillman | G06F 11/073 714/12 |
| 2013/0346260 A1* | 12/2013 | Jubran | G06F 9/5072 705/28 |
| 2014/0325555 A1* | 10/2014 | Khader | H04N 21/2668 725/32 |

* cited by examiner

FINGERPRINT-BASED CONFIGURATION TYPING AND CLASSIFICATION

TECHNICAL FIELD

This disclosure relates to configuration typing and classification of physical, e.g., hardware, devices using fingerprints.

BACKGROUND

Information technology (IT) organizations and service providers, such as providers of cloud-based services, face increasingly large numbers of hardware devices as storage prices decrease and Big Data becomes common. These hardware devices and their subcomponents can number in the thousands. While it is relatively simple to discover and store information related to a single device, it is difficult to know what other devices have similar or identical configurations. Increased scale and a high rate of change experienced by an environment results in frequent part removal or replacement. Together, these elements render manual classification ineffective.

SUMMARY

Disclosed herein are techniques for automatically assigning and managing fingerprints to devices connected by one or more networks. One method taught includes identifying a fingerprint for a first device located on a network, the first device having a plurality of hardware components and the fingerprint generated based on a combination of at least two hardware components of the first device, and assigning the fingerprint to the first device. The method, upon a condition that the device does not have a first identifier assigned to it that identifies the plurality of hardware components, compares the fingerprint to a plurality of stored fingerprints, with at least some of the stored fingerprints having a respective identifier. Upon a condition that the fingerprint matches one of the plurality of stored fingerprints and the one of the plurality of stored fingerprints has an identifier associated therewith, the identifier associated with the one of the plurality of stored fingerprints is assigned to the first device as the first identifier.

An apparatus taught herein includes a memory and a processor. The processor is configured to execute instructions stored in the memory to identify a fingerprint for a first device located on a network, the first device having a plurality of hardware components and the fingerprint generated based on a combination of at least two hardware components of the first device, assign the fingerprint to the first device, upon a condition that the device does not have a first identifier assigned to it that identifies the plurality of hardware components, compare the fingerprint to a plurality of stored fingerprints, with at least some of the stored fingerprints having a respective identifier, and, upon a condition that the fingerprint matches one of the plurality of stored fingerprints and the one of the plurality of stored fingerprints has an identifier associated therewith, assign the identifier with the one of the plurality of stored fingerprints to the first device as the first identifier.

Variations in these and other implementations of the teachings herein will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Organizations desirably classify technical equipment or devices, commonly servers, into particular groups based on the specific combination of physical components forming the device. This is frequently referred to as a stock keeping unit (SKU) or bill of materials (BOM). As soon as a device is classified as one configuration, parts can be removed or inserted, thereby rendering the previous classification incorrect. Keeping track of new and updated devices requires a great deal of inefficient human interaction to remain marginally accurate. In any event, it is almost impossible to reach total accuracy.

One way to address this issue is to build complex business rules in an attempt to sort the devices into buckets based on their components (i.e., their configuration of components). However, the decision tree must be modified each time a new component is added to the environment as a whole. It also must be re-tested to ensure logic integrity has not been compromised once modified. This complexity can lead to inaccuracy and delay and requires a high degree of expert-level human interaction to maintain and troubleshoot the rule set.

In contrast, the teachings herein describe the automated assignment of fingerprints to a device based on the combination of physical components forming the device. In this way, each device on a network has a fingerprint. A database of the devices is updated when an existing device is changed or a new device is added. Each device may also have a SKU field and one or more metadata tags helpful in typing and classifying the devices. This eliminates complex business logic and decision trees through the use of automated, dynamic, tagged fingerprints to group devices. Reporting is also streamlined through generation of reports on fingerprints or fingerprint tags and metadata. Details of the certain implementations of the invention follow an initial discussion of the environment in which they may be implemented.

Figure 1:
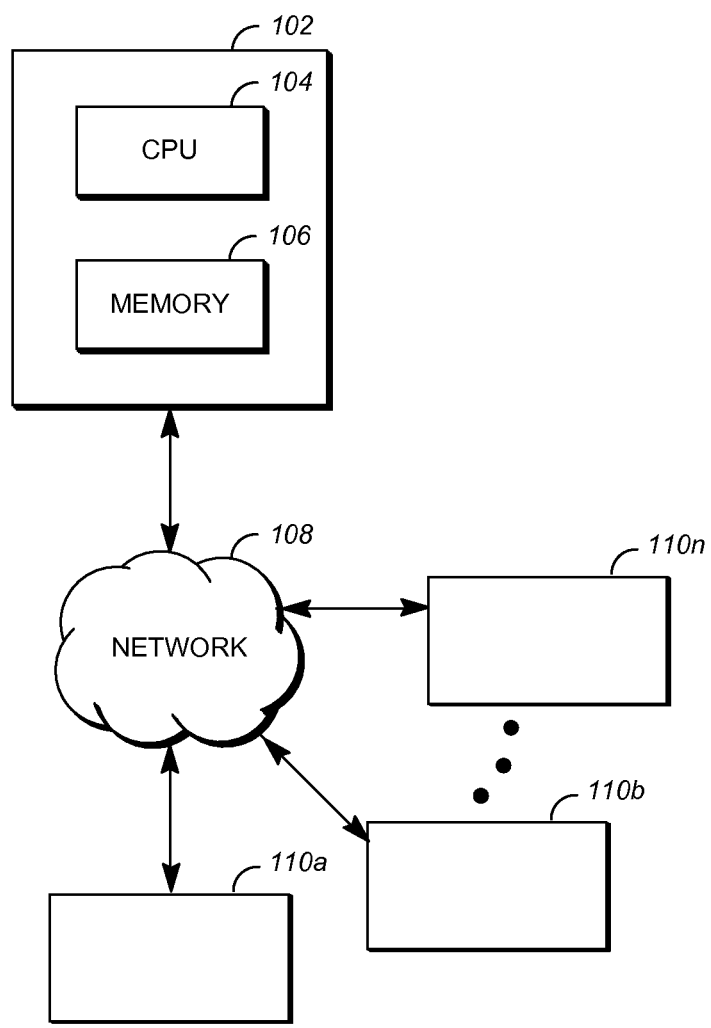
FIG. 1 is a schematic of a computing system in which teachings according to the present invention may be implemented.

FIG. 1 is a schematic of a computing system 100 in which teachings according to the present invention may be implemented. Computing system 100 includes a server station 102. Server station 102 may be, for example, a computer having an internal configuration of hardware such as a central processing unit (CPU) 104 and at least one memory 106. Additional details of one implementation of server station 102 follow with reference to FIG. 2. However, various implementations are possible. Moreover, the functions of server station 102 described hereinafter may be distributed among multiple devices.

A network 108 connects server station 102 with a number of network-enabled devices 110a, 110b, . . . 110n (collectively referred to as devices 110). Network-enabled means that devices 110 are configured to communicate over network 108 as discussed hereinafter. Network 108 can be, for example, the Internet. Network 108 can also be a local area network (LAN), wide area network (WAN), virtual private network (VPN), cellular telephone network or any other means of transferring data between server station 102 and devices 110. Network 108 can be formed of more than one tiered network, and one or more intermediate devices may exist between server station 102 and devices 110.

Devices 110 have a variety of configurations and hence a variety of hardware components. Some of the possible configurations are described with reference to FIG. 2.

Figure 2:
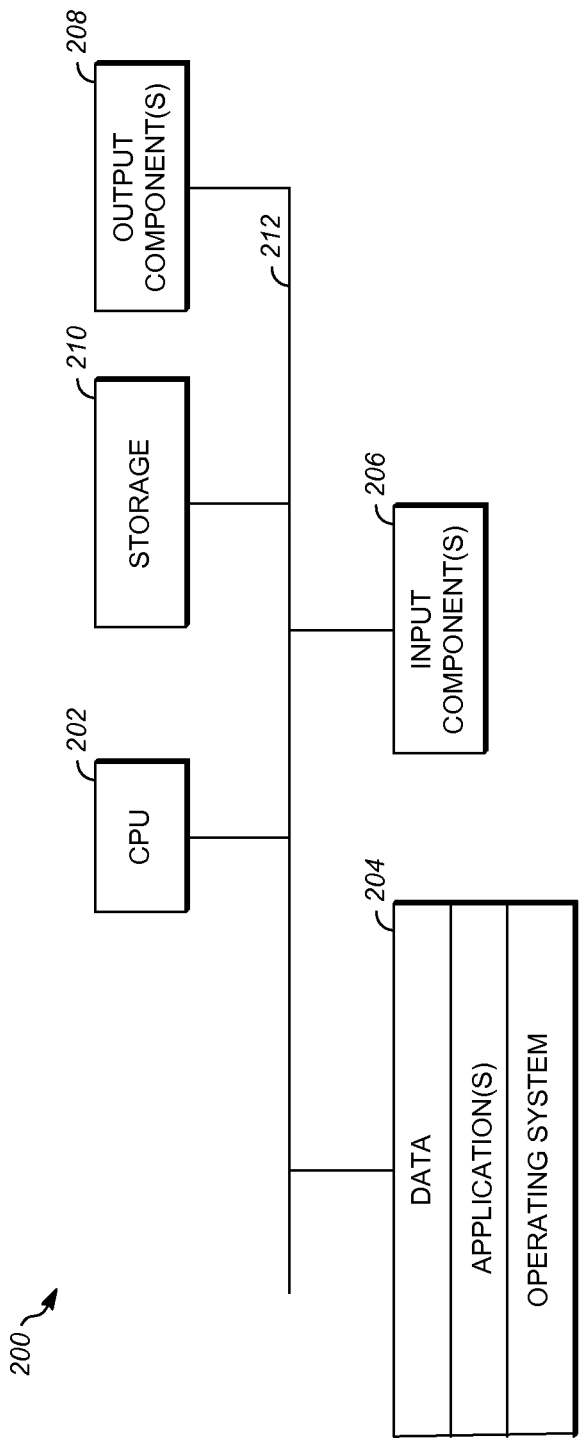
FIG. 2 is a block diagram of a computing device that may be fingerprinted according to the teachings herein.

FIG. 2 is a block diagram of a computing device 200 that may be fingerprinted according to the teachings herein. Computing device 200 may implement one or any of server station 102 and devices 110 of FIG. 1. In FIG. 2, computing device 200 includes a CPU 202 as a conventional central processing unit. Alternatively, CPU 202 can be any other type of component, or multiple components, capable of manipulating or processing information as discussed herein.

A memory component 204 in computing device 200 can be a read only memory (ROM) device or a random access memory (RAM) device in an implementation. Any other suitable type of storage device can be used as memory component 204. Memory component 204 can include an operating system, one or more applications in the form of program code, and data. When computing device 200 implements server station 102, for example, one of the applications may implement the fingerprint-based configuration typing and classification described herein.

Computing device 200 may also include one or more input component(s) 206 and output component(s) 208. Input component 206 may be a camera, keyboard, microphone, etc. Output component 208 may be a display, speaker, etc. Input and output components 206, 208 may also be combined into a single component, for example a touch sensitive display that combines a display with a touch sensitive element that is operable to sense touch inputs.

As shown in FIG. 2, computing device 200 includes a supplemental or secondary storage component 210. Storage component 210 may be a memory card in a format such as a PC card, a CompactFlash, Multimedia Card, etc., or in any other form. A significant amount of data may be required in certain processes performed by computing device 200. Such data may be stored in whole or in part in storage component 210 and loaded into memory component 204 as needed for processing.

The components of computing device 200, namely CPU 202, memory component 204, input component(s) 206, output component(s) 208 and storage component 210, are coupled for communication over a bus component 212. Bus component 212 may be any type of bus that allows communication between the components. In addition, bus component 212 may be coupled to one or more wired or wireless communication components allowing communications external of computing device 200. For example, when computing device 200 is used to implement server station 102, bus component 212 may be used to communicate with devices 110. When computing device 200 is used to implement one or more of devices 110a, 110b, . . . 110n, bus component 212 may be used to communicate with server station 102. Bus component 212 may be composed of multiple bus components.

Although FIG. 2 depicts one particular configuration, computing device 200 may be implemented with a variety of components and form a variety of computing devices. For example, device 110 could be a printer, memory bank, server, client, etc., formed of a number of hardware components. When device 110 is a printer, storage component 210 and output component(s) 208 may be excluded and a printer card may be included as input component 206. When device 110 is a memory bank, memory component 204 may be excluded, and several storage components 210 may be included. Further, and depending on device 110, CPU 202 may instead be one or more other intelligent hardware components, such as an application-specific integrated circuit (ASIC), a Field-Programmable Gate Array (FPGA), etc. Other hardware components not shown may also be used within a device classified according to the teachings herein.

Figure 3:
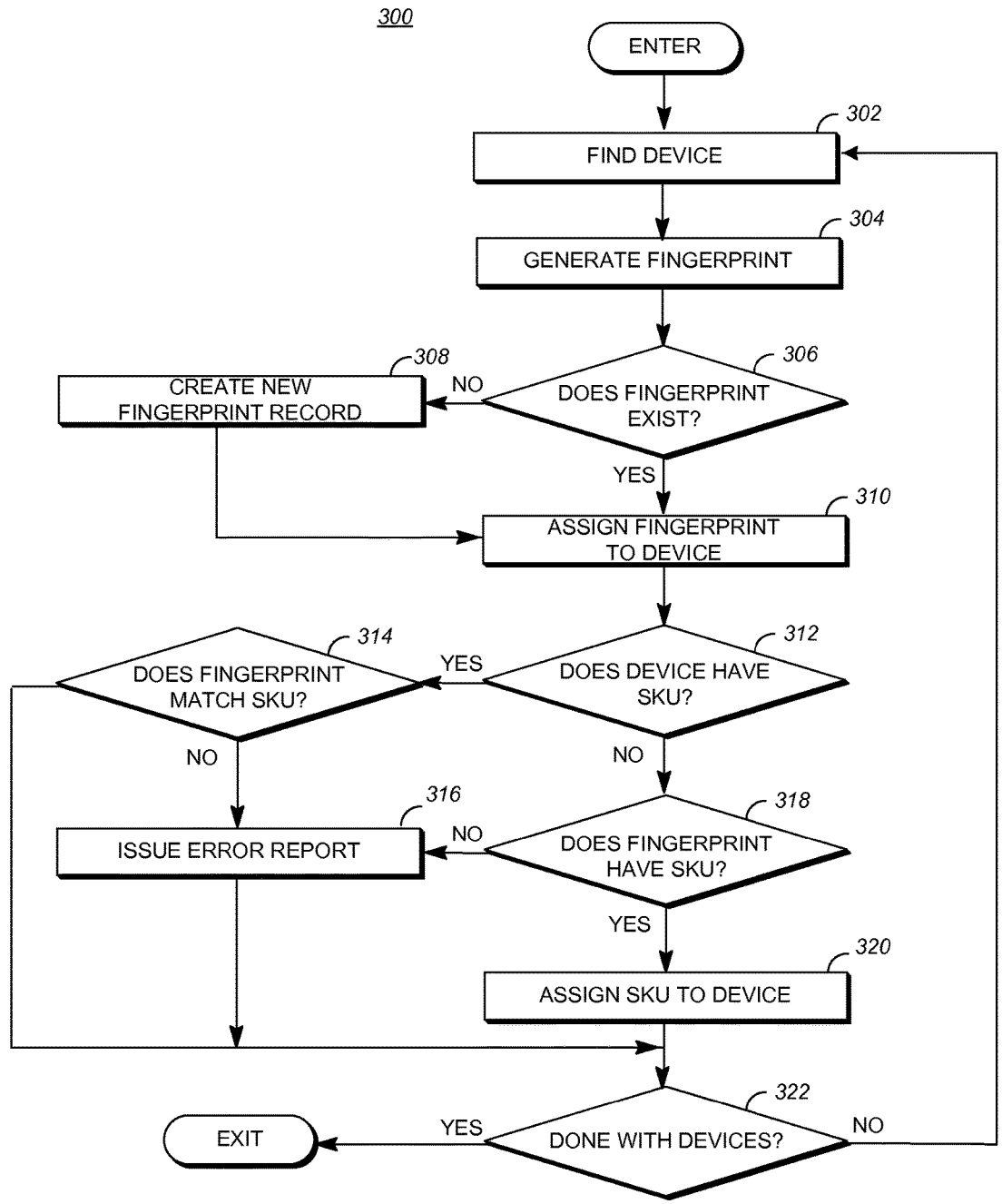
FIG. 3 is a block diagram of a process of fingerprint-based configuration typing and classification according to one implementation of the teachings herein.

FIG. 3 is a block diagram of a process 300 of fingerprint-based configuration typing and classification according to one implementation of the teachings herein. Process 300 is implemented by a computing device, such as server station 102. Process 300 may be implemented as a software program formed of machine-readable instructions that are stored in a memory such that, when executed by a processor, cause the computing device to perform process 300. Process 300 can also be implemented using hardware in whole or in part. As explained above, some computing devices may have multiple memories and multiple processors, and the steps of process 300 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Broadly, process 300 assigns a fingerprint to each combination of physical components forming a network-connected device. Fingerprints are described below in additional detail with reference to FIG. 4. Each device desirably has an identifier where the fingerprint is effectively the "actual" configuration at a point in time, and the identifier may be considered to be the "desired" configuration as described below. The identifier desirably comprises a list of components in the form of, for example, a SKU (or BOM) field and is referred to below as the SKU in this example. Ideally, the fingerprint should match the SKU field every time the fingerprint is generated. If a device has no SKU when the fingerprint is first generated, the fingerprint can be used to assign a SKU if there is a match. If a device has a SKU that does not match the fingerprint, the device is flagged as a mismatch for future investigation and troubleshooting. If a device has a fingerprint that is not tagged with a valid or active SKU, no SKU association is made. Such devices can also be reported on and investigated.

More specifically, process 300 finds a device, for example one of devices 110a, 110b, . . . 110n, at step 302. Finding the device 110 may be responsive to a query, such as a periodic query. The query may also be prompted by the addition of a new device 110 to computing system 100. Responsive to the query, device 110 returns data that can be used to generate a fingerprint as described below. The data may be produced by a processor of device 110 through a query the processor makes to components along a bus of device 110, such as bus component 212. Alternatively, a processor of server device 102 may directly query the identity of components of network-enabled device 110. The query from server device 102 and response from device 110 may be transmitted over network 108, for example.

At step 304, process 300 generates the fingerprint for device 110 using the data responsive to the query. Again, fingerprints are described in additional detail with reference to FIG. 4. At step 306, process 300 queries a data store of fingerprints to determine whether the fingerprint already exists. The data store may be, for example, one or more databases, spreadsheets, etc., stored in memory of server device 102, such as in memory component 204 or storage component 210. If the fingerprint does not exist, process 300 advances to step 308 to create a new fingerprint record in the data store and then assigns the fingerprint to the current device 110 at step 310. If the fingerprint does exist in response to the query of step 306, process 300 advances directly to step 310 to assign the fingerprint to the current device 110. Assigning the fingerprint to the current device 110 may involve storing the fingerprint in association with the current device 110, such as in a database of the data store or elsewhere. The current device 110 may be represented by a location, serial number or other ID number tied to the current device 110, such as in non-volatile memory, which is neither the identifier nor the fingerprint.

After assignment at step 310, process 300 queries as to whether the current device 110 has an identifier, a SKU in this example, at step 312. The identifier may be part of the data received from the current device 110 in response to the initial query.

If the current device 110 has a SKU in response to the query of step 312, process 300 advances to step 314 to query whether the fingerprint matches the SKU. The comparison may be made character-by-character such that a match represents that the fingerprint and SKU are the same. Alternatively, the data store may maintain a correspondence between fingerprints and SKUs. In this case, a match represents that the SKU corresponds to the fingerprint in the data store. If no match exists in response to the query of step 314, process 300 issues an error report at step 316. The error report describes the current device 110 and its mismatched SKU and fingerprint. This mismatch could represent, for example, a change in the actual configuration of the current device 110 (represented by the fingerprint) as compared to the previously-designated configuration (represented by the SKU).

Referring back to step 312, process 300 advances to step 318 if the current device 110 does not have a SKU. At step 318, process 300 queries as to whether the fingerprint has a SKU corresponding to it in, for example, the data store. If not, process 300 advances to step 316 to issue an error report. The error report identifies the fingerprint as a fingerprint without a SKU. This could mean that the current device 110 has a new configuration not previously included in the data store. In contrast, if the fingerprint has a SKU at step 318, process 300 advances to step 320 to assign the SKU from the data store to the current device 110. The SKU may be sent over network 108 for storage in memory component 204 of the current device 110, for example. The SKU may additionally or alternatively be stored, such as in a database of the data store or elsewhere, in association with a location, serial number, etc., tied to the current device 110 that is neither the identifier nor the fingerprint.

After the error report issues at step 316, or the SKU is assigned at step 320, process 300 checks to see whether there are other devices 110 connected in the computing system, such as computing system 100, at step 322. If so, process 300 returns to step 302 to find the next device 110 for typing and classification. Otherwise, process 300 ends. Desirably, process 300 is performed for each device 110a, 110b, . . . 110n connected to the computer system 100 each time process 300 is performed. In certain implementations, process 300 is performed when a device is added solely to add the device and is otherwise performed periodically.

Figure 4:
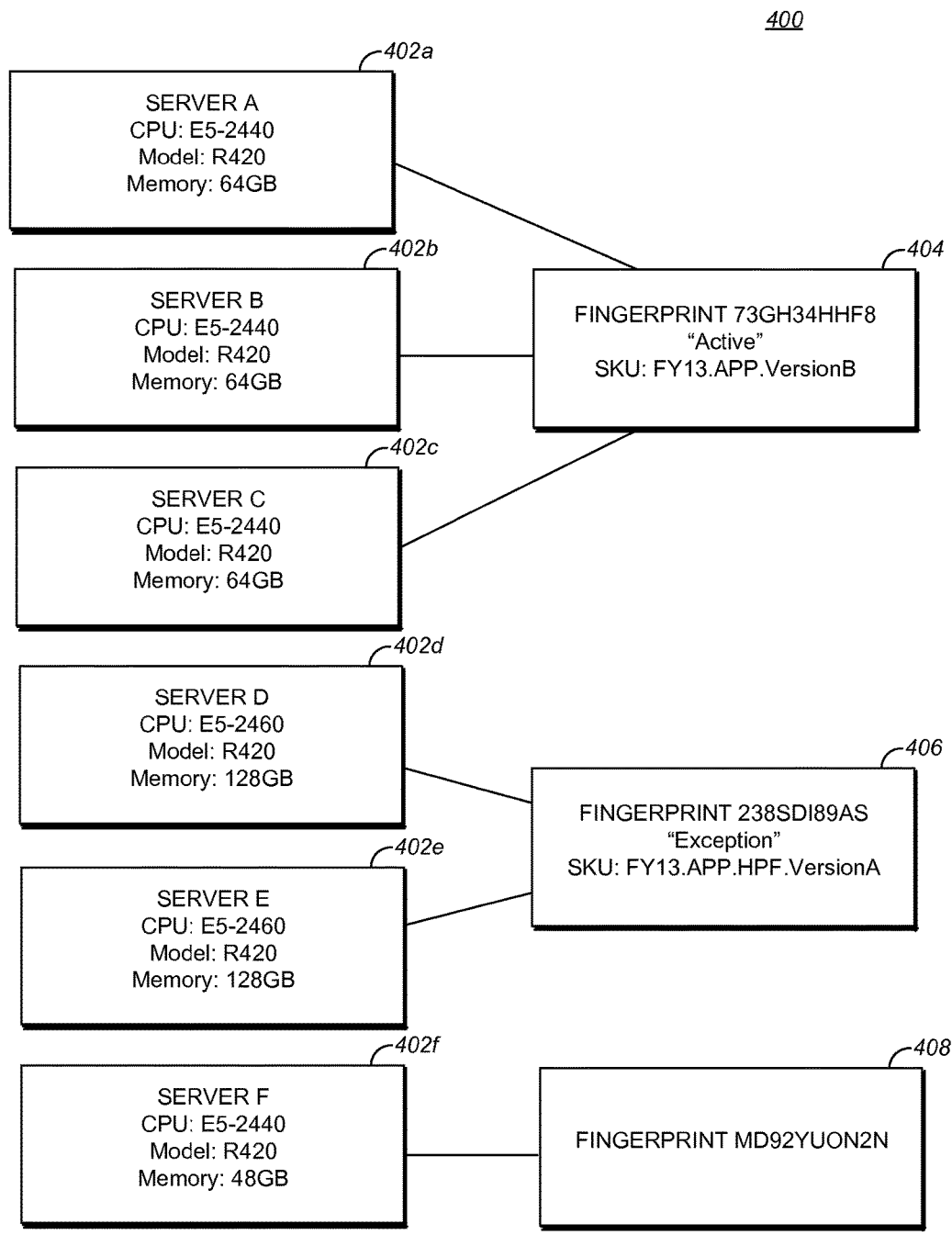
FIG. 4 is a schematic of a server system with fingerprints assigned according to the teachings herein.

FIG. 4 is a schematic of a server system 400 with fingerprints assigned according to the teachings herein. Server system 400 includes six servers 402a to 402f. Server A 402a, server B 402b and server C 402c are assigned a first fingerprint 404, server D 402d and server E 402e are assigned a second fingerprint 406, and server F 402f is assigned a third fingerprint 408.

The fingerprints 404, 406, 408 are dynamically generated at step 304 to create a unique fingerprint based on each unique combination of physical components. A fingerprint is created the first time a specific combination of components is detected, and is expunged when that combination no longer exists. For example, after process 300 is completed for each device 110, any fingerprint not associated with a device 110 may be removed from the data store.

A fingerprint may be generated by a number of techniques, and the particular technique used is not important as long as the same configuration for more than one device results in the same fingerprint. One technique may include using a hash function with the data for the specific hardware components as input. Another technique may involve discarding data associated with one or more of the components and applying a hash or other function or transformation to the remaining data. Yet another technique is to insert the components into a database entry and use the entry index as the fingerprint.

The fingerprint is tunable in that it can be based on various device components such as Model number, CPU, memory, chassis, linecard, etc. It can also be based on ranges. For example, a memory range can be set for plus or minus 4 GB, so that otherwise identical devices with 7 GB, 9 GB and 9.5 GB would be grouped into one 8 GB set (i.e., under one fingerprint) and machines with 15 GB, 16 GB, and 17 GB would be grouped into one 16 GB set (i.e., under another fingerprint). This tunable behavior allows the user to define how loose or granular to be when creating fingerprints. Once granularity is set, human interaction is not needed in the creation of the fingerprints. Process 300 can run frequently on a configurable basis to ensure data is timely and accurate.

Implementations of the present invention also provide for metadata tagging of the fingerprints. Metadata tagging provides labels with information that may be useful to the user of the data store. Various tags are possible and may be stored with a server, device or both, in association with a fingerprint. For example, many computing systems 100 will have a long tail distribution of fingerprints, where a large number of devices fall into a small number of fingerprints but relatively unique configurations result in a large number of fingerprints with very few matching devices. For example, the most common fingerprint with a current configuration can be tagged with the metadata tag of "Approved", "Current" or "Active" as with fingerprint 404 of FIG. 4. As another example, a configuration that is no longer desirably used can be tagged with the metadata tag of "Obsolete" or "Exception" as with fingerprint 406 of FIG. 4. In this or another implementation, the identifiers such as SKUs may also be assigned with a name that is easily recognizable or that refers to a documented configuration standard, for example.

Note that tag association may be non-exclusive, allowing the same tag to be shared across multiple fingerprints. This allows multiple fingerprints to be coalesced into larger groups for management or reporting. Tags may be assigned after process 300 is complete. In an alternative implementation, the metadata tag(s) may be associated with the identifier, such as the SKU.

According to the teachings herein, problems with keeping track of devices connected in a distributed computing system are addressed by automating the generation of fingerprints in a way that permits tracking of new and changed devices. Each device can be tagged with metadata for easier tracking. The automated fingerprint-based grouping, reporting and rapid classification of large groups of similar physical components described herein eliminates complex business logic and decision trees by using automated, dynamic, tagged fingerprints to group devices. Administration of this model simply becomes tagging the most common fingerprints (e.g., associating the fingerprint to an identifier) and investigating a small number of outlier fingerprints as they are identified. Reporting is similarly streamlined as reports can immediately be generated on fingerprint or fingerprint tags and metadata.

Implementations of server station 102 and/or devices 110 (and the algorithms, methods, instructions, etc., stored thereon and/or executed thereby) can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

All or a portion of implementations of the present invention can take the form of a computer program product accessible from, for example, a tangible, non-transitory computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for automated fingerprint generation to track changes to a respective configuration of each of a plurality of devices located on a network and addition of new devices to the network, comprising:
   identifying a fingerprint of a device of the plurality of devices located on the network, wherein the fingerprint is generated as a function of a plurality of hardware components of the device such that different hardware components of the same type or capacity are equivalent inputs to the function and have identical fingerprints output by the function;
   assigning the fingerprint to the device and storing a first identifier of the device in association with the fingerprint, wherein the fingerprint is previously assigned to an additional device of the plurality of devices and previously stored in association with a first identifier of the additional device, wherein the additional device comprises hardware components of the same type or capacity as the plurality of hardware components of the device;
   determining whether the device has a second identifier associated with configuration of the device;
   responsive to determining that the device does not have the second identifier:
      comparing the fingerprint to a plurality of stored fingerprints, wherein a subset of the stored fingerprints are associated with stored second identifiers;
      based on determining that the fingerprint does correspond to a respective stored fingerprint of the plurality of stored fingerprints, further determining whether the respective stored fingerprint is associated with one of the stored second identifiers;
      based on determining that the respective stored fingerprint is associated with a respective stored second identifier, associating the respective stored second identifier with the device, wherein associating the respective stored second identifier with the device comprises:
         storing the respective stored second identifier in association with the first identifier of the device; and
         transmitting the respective stored second identifier to the device for storage at the device; and
      based on determining that the respective stored fingerprint is not associated with one of the stored second identifiers, generating an error report configured to indicate that one or both of there is no stored second identifier associated with the respective stored fingerprint or that the configuration of the device is new; and
   responsive to determining the device does have the second identifier, determining whether the fingerprint corresponds to the second identifier; and
      responsive to determining the fingerprint does not correspond to the second identifier, generating an additional error report configured to indicate that one or both of the fingerprint does not correspond to the second identifier or that the configuration of the device is new.

2. The method of claim 1, wherein identifying the fingerprint comprises:
   receiving, over the network, identities of the plurality of hardware components of the device.

3. The method of claim 1, comprising storing a stock keeping unit or bill of material as the stored second identifier.

4. The method of claim 1 wherein a first informational metadata tag is assigned to more than one of the plurality of stored fingerprints.

5. An apparatus for automated fingerprint generation to track changes to a respective configuration of each of a plurality of devices located on a network and addition of new devices to the network, comprising:
   a memory; and
   a processor configured to execute instructions stored in the memory to:
      identify a fingerprint of a device of the plurality of devices located on the network, wherein the fingerprint is generated as a function of a plurality of hardware components of the device such that different hardware components of the same type or capacity are equivalent inputs to the function and have identical fingerprint outputs by the function;

assign the fingerprint to the device and store a first identifier of the device in association with the fingerprint, wherein the fingerprint is previously assigned to an additional device of the plurality of devices and previously stored in association with a first identifier of the additional device, wherein the additional device comprises hardware components of the same type or capacity as the plurality of hardware components of the device;

determine whether the device has a second identifier associated with configuration of hardware components of the device;

responsive to determining that the device does not have the second identifier:

compare the fingerprint to a plurality of stored fingerprints, at least some of the stored fingerprints having a respective stored second identifier; and determine whether the fingerprint corresponds to a stored fingerprint of the plurality of stored fingerprints having the respective stored second identifier associated therewith;

based on determining the fingerprint corresponds to the stored fingerprint of the plurality of stored fingerprints having the respective stored second identifier associated therewith, assign the respective stored second identifier associated with the stored fingerprint to the device, wherein the stored fingerprint is associated with multiple different devices such that the respective stored second identifier associated with the stored fingerprint is assigned to each of the multiple different devices, wherein assigning the respective stored second identifier associated with the stored fingerprint to the device comprises:

storing the respective stored second identifier in association with the first identifier of the device; and transmitting the respective stored second identifier to the device for storage at the device; and based on determining that the fingerprint does not correspond to the stored fingerprint not having the respective second identifier associated therewith, generate an error report configured to indicate that one or both of there is no stored second identifier associated with the fingerprint or that the configuration of hardware components of the device is new; and responsive to determining the device does have the second identifier, determining whether the fingerprint corresponds to the second identifier; and responsive to determining the fingerprint does not correspond to the second identifier, generating an additional error report configured to indicate that one or both of the fingerprint does not correspond to the second identifier or that the configuration of the device is new.

6. The apparatus of claim 5 wherein a metadata tag is assigned to more than one of the plurality of stored fingerprints, the metadata tag including at least one word indicating a status of devices associated with more than one of the plurality of stored fingerprints.

7. The apparatus of claim 5 wherein the processor is configured to execute instructions stored in the memory to generate the fingerprint using a hash function with identities of the plurality of hardware components of the device as inputs.

8. The apparatus of claim 5 wherein the processor is configured to execute instructions stored in the memory to, based on determining that the fingerprint does not correspond to one of the stored fingerprints of the plurality of stored fingerprints, store the fingerprint in the plurality of stored fingerprints.

9. The method of claim 1 wherein the respective stored fingerprint of the plurality of stored fingerprints is associated with multiple devices such that the respective stored second identifier is associated with a respective first identifier of each of the multiple devices.

10. The method of claim 1, comprising:

determining that an actual configuration of the device comprises an expected configuration of the device when the respective stored second identifier associated with the configuration of the device is the same as the fingerprint.

11. The method of claim 1, wherein hardware components being equivalent inputs comprise hardware components within a range of capacities.

12. The method of claim 11, wherein the range of capacities comprises a range of memory sizes as being equivalent hardware components.

13. The method of claim 1, wherein a granularity of the function is tuned by adjusting whether additional hardware components or fewer hardware components have identical fingerprints output by the function.

14. The apparatus of claim 5, wherein the processor is configured to execute instructions stored in the memory to tag the fingerprint with a metadata tag indicating a status of the hardware configuration.

15. The method of claim 1, wherein determining the device does not have the second identifier associated with the configuration of the device comprises:

determining the first identifier of the device is not stored in association with the second identifier.

16. The method of claim 1, wherein the fingerprint does not correspond to the second identifier when the fingerprint does not match the second identifier.

17. The method of claim 1, comprising:

determining an additional stored fingerprint of the plurality of stored fingerprints is not stored in association with any first identifier of a plurality of first identifiers, wherein the plurality of first identifiers comprises the first identifier of the device and each of the plurality of first identifiers respectively correspond to one of a plurality of devices located on the network; and based on determining the additional stored fingerprint is not stored in association with any first identifier of the plurality of first identifiers, deleting the additional stored fingerprint.

18. The method of claim 1, wherein each of the subset of the stored fingerprints is stored in association with the respective stored second identifier of the stored second identifiers.

* * * * *